No. 724,302. PATENTED MAR. 31, 1903.
J. LIPKOWSKI.
ENGINEER'S AIR BRAKE CONTROLLING VALVE.
APPLICATION FILED JAN. 31, 1903.
NO MODEL. 3 SHEETS—SHEET 1.
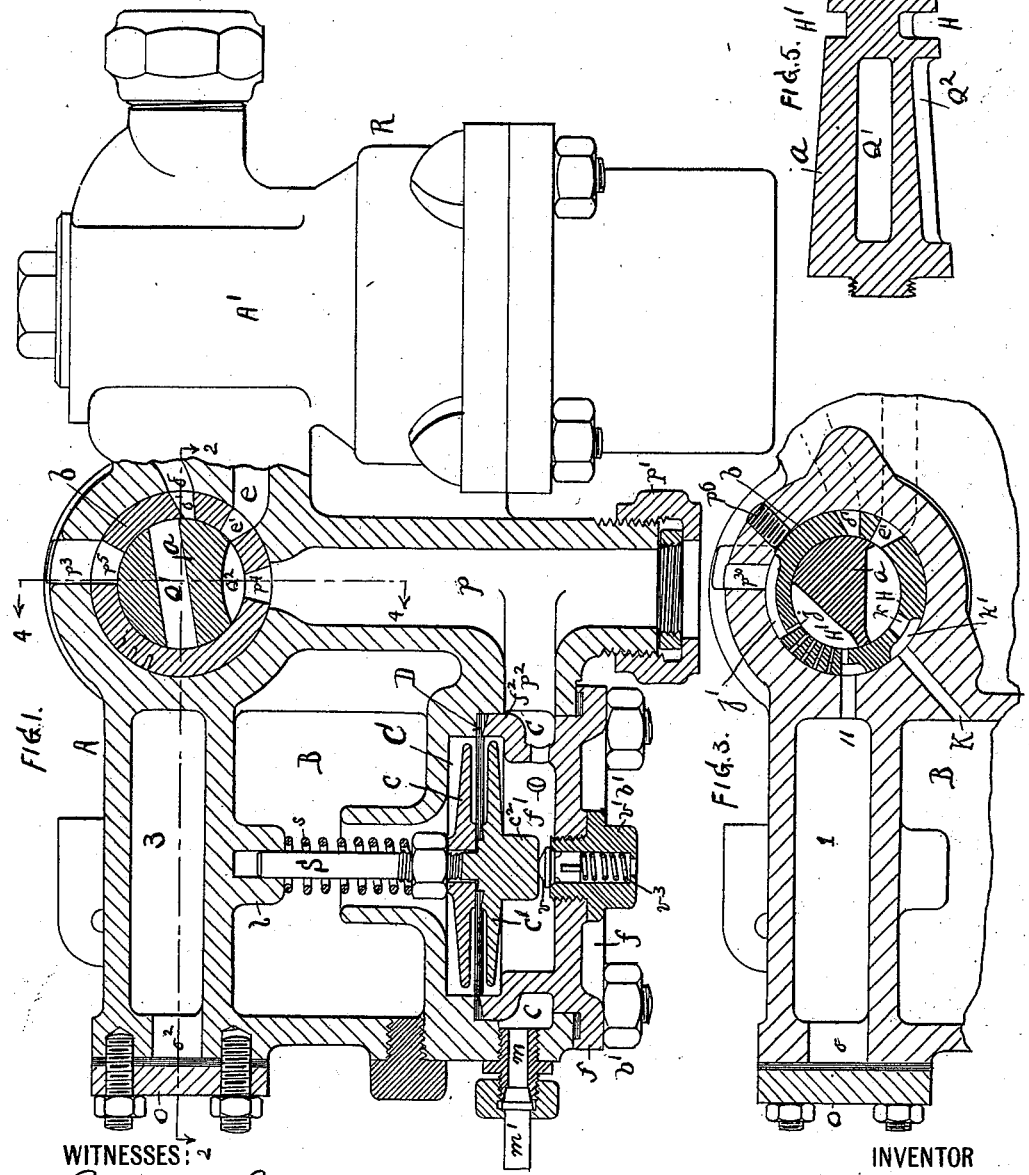
WITNESSES:
F.W. Wright
E.W. Collins
INVENTOR
JOSEPH LIPKOWSKI
BY
Howson and Howson
HIS ATTORNEYS No. 724,302. PATENTED MAR. 31, 1903.
J. LIPKOWSKI.
ENGINEER'S AIR BRAKE CONTROLLING VALVE.
APPLICATION FILED JAN. 31, 1903.
NO MODEL. 3 SHEETS—SHEET 2.
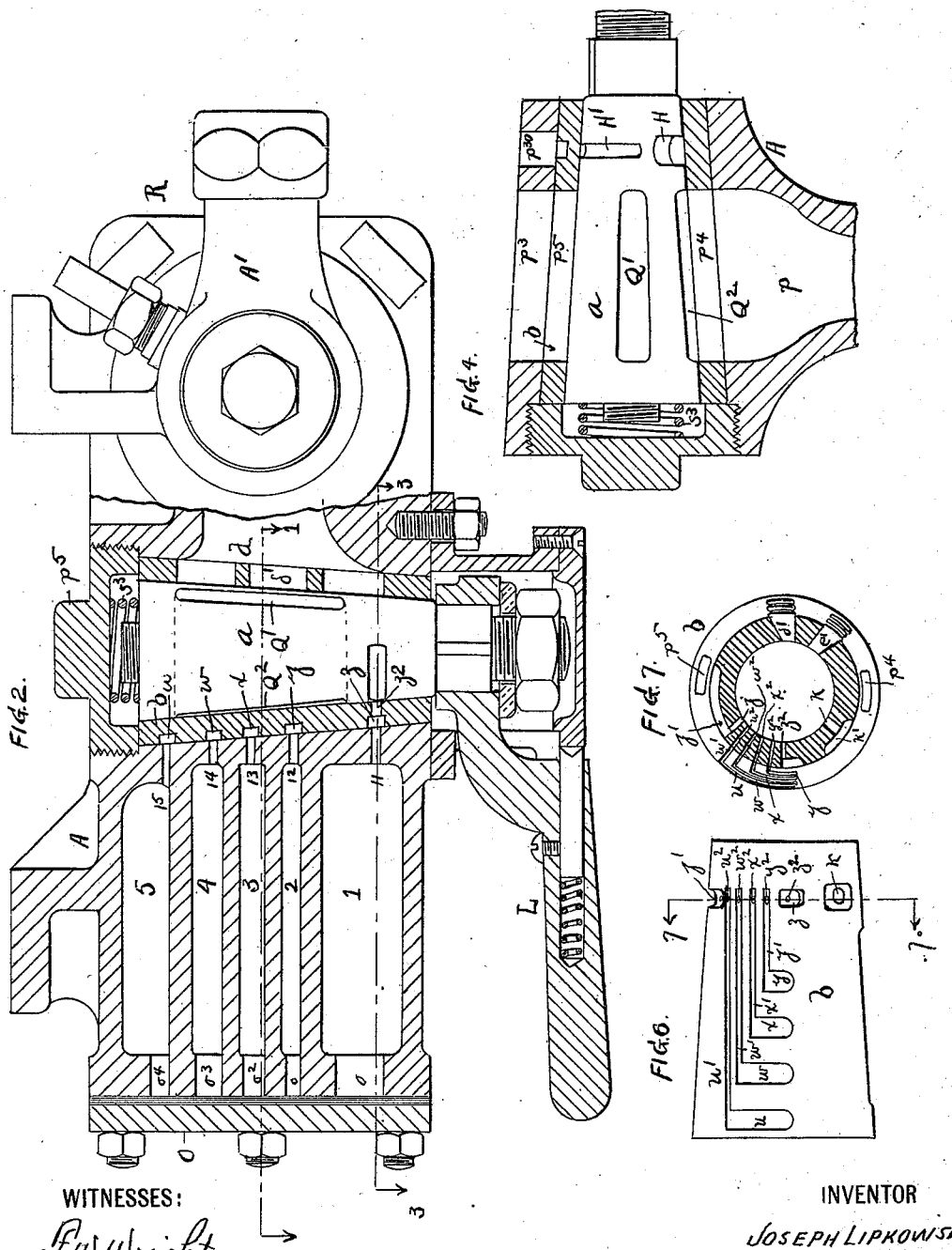
WITNESSES:
F. W. Wright
E. W. Collins
INVENTOR
JOSEPH LIPKOWSKI
BY
Howson and Howson
HIS ATTORNEYS No. 724,302. PATENTED MAR. 31, 1903.
J. LIPKOWSKI.
ENGINEER'S AIR BRAKE CONTROLLING VALVE.
APPLICATION FILED JAN. 31, 1903.
NO MODEL. 3 SHEETS—SHEET 3.
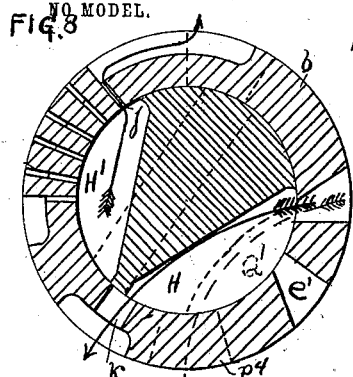
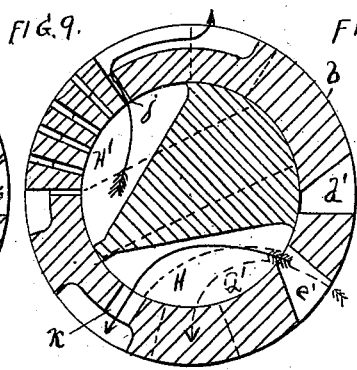
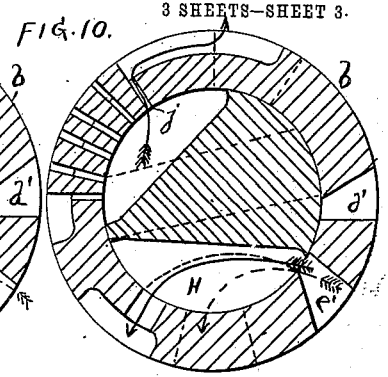
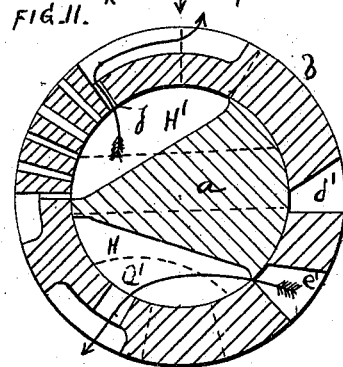
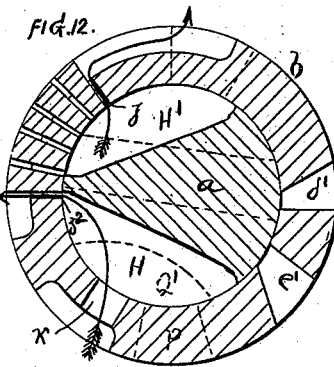
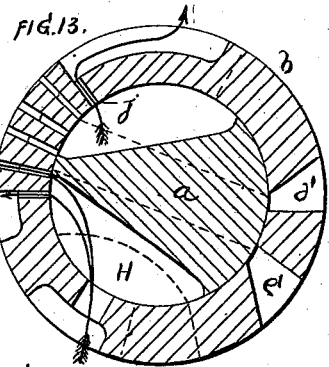
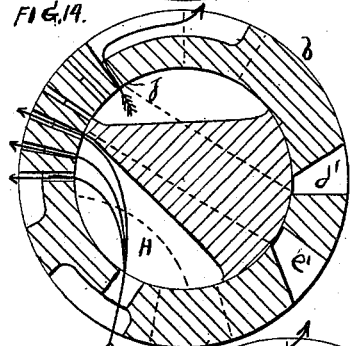
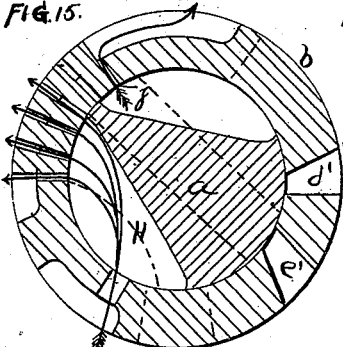
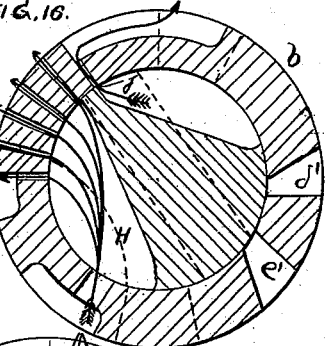
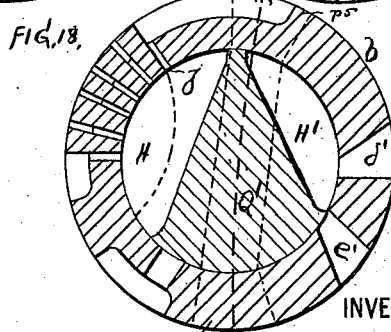
WITNESSES:
F. W. Wright
E. W. Collins
INVENTOR
JOSEPH LIPKOWSKI
BY
Howson and Howson
HIS ATTORNEYS

UNITED STATES PATENT OFFICE.

JOSEPH LIPKOWSKI, OF PARIS, FRANCE, ASSIGNOR TO SOCIÉTÉ GENERALE DES FREINS LIPKOWSKI, OF PARIS, FRANCE.

ENGINEER'S AIR-BRAKE-CONTROLLING VALVE.

SPECIFICATION forming part of Letters Patent No. 724,302, dated March 31, 1903.

Application filed January 31, 1903. Serial No. 141,317. (No model.)

*To all whom it may concern:*

Be it known that I, JOSEPH LIPKOWSKI, a subject of the Emperor of Russia, residing in Paris, France, have invented Improvements in Engineers' Air-Brake-Controlling Valves, of which the following is a specification.

This invention relates to a valve to be placed in the cab of the locomotive to be operated by the engineer to definitely control the amount of pressure in the train-pipe in similar manner to the valve described in my United States Patent No. 693,874.

The main object of this invention is to improve the construction of the valve shown and described in the above-mentioned patent and to simplify and cheapen the cost of manufacture.

In the accompanying drawings, Figure 1 is a central sectional elevation on the line 1 1, Fig. 2. Fig. 2 is a horizontal section on the line 2 2, Fig. 1. Fig. 3 is a sectional elevation on line 3 3, Fig. 2. Fig. 4 is a section on the line 4 4, Fig. 1. Fig. 5 is a central section of the rotary valve-plug. Fig. 6 is a side elevation of the fixed barrel for the plug; and Fig. 7 is a sectional view on line 7 7, Fig. 6. Figs. 8 to 18 are similar sectional views of the plug and barrel on the same sectional line as Fig. 3, showing the various positions of the plug to produce various degrees of braking.

The casing A is formed with a tapering central opening to receive the plug-barrel $b$. To the left of this opening a number of expansion-chambers 1 2 3 4 5 are formed one back of the other on top of the auxiliary chamber B, as shown. Below these chambers is the comparatively large auxiliary chamber B, having an annular chamber C in its lower outside face. From the barrel-opening leads a passage $p$, which terminates in an open threaded end to receive the coupling $p'$ for the train-pipe. An open passage $p^2$ from this pipe $p$ extends to the left and opens into the chamber C below the auxiliary chamber B. A port in two parts $p^3 p^{30}$ opens upward from the barrel-opening, while ports $d$ and $e$ open to the right into a suitable casing A' of a pressure-regulator R. A closing cap or part $f$, having an annular flange $f^2$, with openings $f'$ to the chamber C and to the passage $p^2$, is secured by bolts $b'$ $b'$ to the casing A, so as to tightly close the chamber C to the air. Before securing this cap $f$ in place, however, a diaphragm D is placed within the upper part of the chamber C and at its outer edges, between the flanges $f^2$ and a shoulder in the casing, while near the center the diaphragm is clamped between the two disks C and C', having an upwardly-extending spindle S, guided in a lug $l$, cast on the top of the chamber B. A spring $s$ tends to force the diaphragm in a downward direction to cause a projection $c^2$ on the disk $c'$ to bear on a valve $v$ and keep it on its valve-seat in a nipple $v'$, screwed into the cap $f'$. This nipple has a central opening containing a slight spring $v^3$, tending to open the valve $v$ when the spring $s$ is released from the weight of the disk $c'$ by rise of the diaphragm, as hereinafter described. A port $m$ may be left in the wall of the chamber C to receive a pipe $m'$ to be connected with a gage. Openings $o$ $o'$ $o^2$ $o^3$ $o^4$ are left in the side of the expansion-chambers 1, 2, 3, 4, and 5 for ease in manufacture and to provide means for cleaning out and draining these chambers after long service. A single plate O, bolted to the casing A, serves to close these openings to the air. Small ports 11, 12, 13, 14, and 15 open from the expansion-chambers 1, 2, 3, 4, and 5 to the barrel-opening, these ports being arranged in a line and parallel with the axis of the barrel $b$. The port $d$ communicates directly with the main air-reservoir and pumps, while the port $e$ communicates with the pressure-regulator R. The barrel $b$ is inserted into the central opening from the back and secured longitudinally by the screwed plug $p^5$ and prevented from rotary motion by the set-screw $p^6$. This barrel has grooves $u$, $w$, $x$, $y$, and $z$ in its outer surface, registering with the ports 15, 14, 13, 12, and 11, respectively. These grooves are of different lengths on the circumference of the barrel, as shown in Fig. 6, and severally lead into longitudinal grooves $u'$ $w'$ $x'$ $y'$, &c. These latter grooves terminate in openings $u^2$ $w^2$ $x^2$ $y^2$, &c., which penetrate to the inside of the barrel, as shown in Fig. 7. The barrel is formed with ports $d'$ $e'$, corresponding in position with ports $d$ and $e$, while large ports $p^4$ and $p^5$ open one to the passage $p$ and the other to the port $p^6$. A port $k$ and groove $k'$ open through the barrel and communicate with a passage K to the auxiliary chamber B, while a port $j$ in the plane with ports $z^2$ $y^2$, &c., connects with a groove $j'$, communicating with the port $p^{30}$. The plug $a$ fits into the tapering bore of the barrel and is held against it by the spring $s^3$, while to its outer end is fastened a suitable hand-lever L. This plug has a central opening $Q'$ and a groove $Q^2$, both extending nearly half the entire length of the plug, while two grooves H H' are formed near one end, bearing a V-shaped piece of metal between them. These grooves H H' are adapted to register with the openings $z^2$ $x^2$ $y^2$, &c., while the opening $Q'$ and groove $Q^2$ are adapted to communicate with all the other openings in the barrel.

Figs. 8 to 18 best illustrate the operation of this valve. Fig. 8 shows the position when the air from the source of pressure is passing through port $d'$, groove $Q'$ to the train-pipe passage $p$, and through groove H and port $k$ to the auxiliary chamber B. Pressure in the train-pipe now releases the train-brakes, while the expansion-chambers are open to the air through the groove H' and port $j$. On turning the cock to the position of Fig. 9 the same arrangement holds, except that the train-pipe passage is controlled through the pressure-regulator to give a uniform pressure. Fig. 10 is similar to Fig. 9, but with the air partially throttled from the regulator, while Fig. 11 shows the train-pipe isolated from the source of pressure. In Fig. 12 the source of air-pressure is cut off and the air in the chamber B allowed to expand through ports $k$ and $z^2$ into the expansion-chamber $l$. This reduces the pressure on the upper side of the diaphragm D, which is forced upward by the train-pipe pressure, allowing the spring $v'$ to open the valve $v$, whereupon the train-pipe air will escape until the pressure is again equal on both sides of the diaphragm, by moving the plug into the position of Figs. 13, 14, 15, and 16, each time slightly diminishing the train-pipe pressure, as above described. Fig. 17 shows the chamber B communicating by the port $k$ and groove H with port $j$ and the outer air direct, reducing the pressure in the chamber B and consequently that in the train-pipe very rapidly, while Fig. 18 shows the train-pipe connected directly to the open port $p^3$ by the hole $Q'$ for emergency application of the brakes.

I claim as my invention—

1. An engineer's valve for air-brakes, comprising a train-pipe passage, an auxiliary chamber, a valve controlled by the pressure in the auxiliary chamber and train-pipe and expansion-chambers above the auxiliary chamber, said expansion-chambers being arranged side by side, substantially as described.

2. An engineer's valve for air-brakes, comprising a plug, a barrel for the plug, openings through the barrel communicating with longitudinal grooves on the outside of the barrel, and a circumferential groove terminating in each longitudinal groove, in combination with expansion-chambers having openings, each such opening registering with one of the circumferential grooves, substantially as described.

3. An engineer's valve for air-brakes, comprising a plug, a barrel therefor, openings through the plug and barrel, a train-pipe passage, an auxiliary chamber, a valve controlled by the pressure in said chamber and in the train-pipe passage, a series of expansion-chambers on the top of the auxiliary chamber, one chamber over the outer forward edge of the auxiliary chamber and the rest back of that one after another, and passages from these chambers leading to openings in the barrel, each passage isolated from the next, and all said barrel-openings being in one plane around and opening through the barrel, substantially as described.

In testimony whereof I have signed my name to this specification in the presence of two subscribing witnesses.

JOSEPH LIPKOWSKI.

Witnesses:
PRINCE ALEXIS ENGALITSCHOFF,
MORYAN POREBSKI.